United States Patent
Dhawan et al.

(10) Patent No.: US 8,672,295 B2
(45) Date of Patent: Mar. 18, 2014

(54) GATE VALVE

(75) Inventors: Samir Dhawan, Uttarakhand (IN); Jason Neal Whaley, Hartshorne, OK (US); David Kay, Hartlepool (GB); Randall Ferrain Weaver, McAlester, OK (US); Neil Colin Kennedy, Prudhoe (GB)

(73) Assignee: National Oilwell Varco, L.P., Houston, TX (US)

( * ) Notice: Subject to any disclaimer, the term of this patent is extended or adjusted under 35 U.S.C. 154(b) by 409 days.

(21) Appl. No.: 12/900,682

(22) Filed: Oct. 8, 2010

(65) Prior Publication Data

US 2012/0085957 A1    Apr. 12, 2012

(51) Int. Cl.
*F16K 3/00* (2006.01)
*F16K 25/00* (2006.01)

(52) U.S. Cl.
USPC .......................... 251/328; 251/174; 251/193

(58) Field of Classification Search
USPC ................. 251/157, 174, 176, 193, 326, 328
See application file for complete search history.

(56) References Cited

U.S. PATENT DOCUMENTS

| 2,796,230 | A |   | 6/1957  | Grove et al. |            |
|-----------|---|---|---------|--------------|------------|
| 3,060,964 | A |   | 10/1962 | Bagwell      |            |
| 4,320,890 | A | * | 3/1982  | Meyer et al. | 251/328    |
| 4,401,292 | A |   | 8/1983  | Whaley       |            |
| 4,741,509 | A |   | 5/1988  | Bunch et al. |            |
| 4,771,805 | A | * | 9/1988  | Maa          | 137/454.6  |
| 4,824,074 | A |   | 4/1989  | Baugh        |            |
| 4,878,651 | A |   | 11/1989 | Meyer, Jr.   |            |
| 5,139,274 | A |   | 8/1992  | Oseman       |            |
| 5,192,051 | A |   | 3/1993  | Roberson     |            |
| 5,201,872 | A |   | 4/1993  | Dyer         |            |
| 6,260,822 | B1 |  | 7/2001  | Puranik      |            |
| 6,279,875 | B1 |  | 8/2001  | Chatufale    |            |
| 6,345,805 | B1 |  | 2/2002  | Chatufale    |            |
| 6,929,244 | B1 |  | 8/2005  | Law et al.   |            |
| 6,966,537 | B2 |  | 11/2005 | Sundararajan |            |
| 7,004,452 | B2 | * | 2/2006  | Chatufale    | 251/171    |
| 2004/0032088 | A1 | * | 2/2004 | Janoff et al. | 277/322  |
| 2004/0178381 | A1 | * | 9/2004 | Sundararajan  | 251/175  |
| 2009/0179388 | A1 | * | 7/2009 | Uhlenkamp et al. | 277/608 |

OTHER PUBLICATIONS

PCT/US2011/054958 International Search Report and Written Opinion, Jan. 31, 2012 (17 p.).

* cited by examiner

*Primary Examiner* — John K Fristoe, Jr.
*Assistant Examiner* — Kevin Barss
(74) *Attorney, Agent, or Firm* — Conley Rose, P.C.

(57) ABSTRACT

A gate valve comprises a valve body having an internal working fluid passage and an internal gate chamber extending transverse to the working fluid passage. In addition, the gate valve comprises a gate disposed in the internal gate chamber and movable within the gate chamber between a closed position obstructing fluid flow through the working fluid passage and an open position allowing fluid flow through the working fluid passage. Further, the gate valve comprises an internal sealing arrangement coaxially disposed in the working fluid passage and extending between the valve body and the gate to form a barrier between the internal working fluid passage and the gate chamber. The internal sealing arrangement includes a frustoconical metal sealing surface adapted to sealingly engage an opposed mating frustoconical metal sealing surface on the valve body to form a first tapered metal-to-metal seal between the sealing arrangement and the valve body.

24 Claims, 12 Drawing Sheets

GATE VALVE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

1. Field of the Invention

The invention relates generally to gate valves for controlling fluid flow. More particularly, the invention relates to sealing assemblies for gate valves.

2. Background of the Technology

In general, a valve is a device that controls fluid flow through a conduit. A gate valve or sluice valve is a particular type of valve that opens by lifting a round or rectangular gate out of the path of the fluid. Gate valves typically include a valve body including a fluid flow passageway, a gate chamber perpendicular to the fluid flow passageway, and a gate slidably disposed in the gate chamber. A bonnet is secured to the top of the valve body and closes off the gate chamber from the external environment. The gate is moveable within the gate chamber between a "closed" position in which gate extends across the fluid flow passageway and obstructs the flow of fluid through the valve, and an "opened" position in which the gate does not obstruct the flow of fluid through the valve. A stem extending through the bonnet and into the gate chamber is coupled to the gate and used to externally control the position of the gate (i.e., to open and close the gate).

Most gate valves also include an upstream and a downstream valve seat, each disposed in the fluid flow passageway and extending between the valve body and the gate. In particular, the valves seats allow fluid flow through the valve, but function to restrict fluid communication between the gate chamber and the fluid flow passageway.

Typically, when the valve is closed, either the upstream valve seat functions to isolate the gate chamber from the fluid flow passageway, or the downstream valve seat functions to isolate the gate chamber from the fluid flow passageway, but not both simultaneously. For upstream sealing valve seats, the fluid in the passageway upstream of the closed gate is prevented from reaching the gate chamber. This provides the advantage of limiting potentially corrosive fluids in the closed valve upstream of the gate from reaching the gate chamber. Further, by preventing such corrosive fluids from entering the gate chamber, risks to maintenance and service personnel that may need to periodically close and access the gate valve are reduced. However, a phenomena referred to as the "double blocking effect" often arises in upstream sealing valve seats. The double blocking effect occurs when both the upstream and downstream valve seat are compressed against the gate, thereby making the gate difficult to move within the gate chamber to transition the valve between the closed and open positions.

On the other hand, for downstream sealing valve seats, the fluid in the passageway upstream of the closed gate is allowed to reach the gate chamber, however, the downstream valve seat prevents the fluid in the gate chamber from reaching the portion of the fluid passageway downstream of the gate. This design tends to reduce or eliminate the double blocking effect, but exposes the gate chamber, as well as service and maintenance personnel that access the closed valve body, to potentially corrosive fluids. Due to the aforementioned advantages and disadvantages in upstream sealing valve seats and downstream sealing valve seats, selection of the appropriate gate valve (i.e., a gate valve with an upstream sealing valve seat or a downstream sealing valve seat) will depend on the particular application and type of fluid that will be flowing through the valve. However, in some cases, conditions and/or the fluid flowing through the valve may change, and the gate valve initially selected and installed is no longer ideal.

In many conventional gate valves, the valve seat forms a planar metal-to-metal axial seal with the valve body. However, with such planar axial seals, debris in the fluid flowing through the valve can get trapped between the sealing surfaces and repeatedly pressed between the sealing surfaces as the valve is periodically opened and closed. Overtime, such debris may abrasively wear the sealing surfaces and compromise their ability to effectively sealingly engage.

Accordingly, there remains a need in the art for improved gate valves. Such gate valves would be particularly well received if they provided enhanced durability, could be configured, in the field, to include upstream sealing valve seats or downstream sealing valve seats, and reduced the risk of maintenance and service personnel being exposed to corrosive fluid within the valve.

BRIEF SUMMARY OF THE DISCLOSURE

These and other needs in the art are addressed in one embodiment by a gate valve. In an embodiment, the gate valve comprises a valve body having an internal working fluid passage with a longitudinal axis and an internal gate chamber extending transverse to the working fluid passage. In addition, the gate valve comprises a gate disposed in the internal gate chamber and movable within the gate chamber between a closed position obstructing fluid flow through the working fluid passage and an open position allowing fluid flow through the working fluid passage. Further, the gate valve comprises an internal sealing arrangement coaxially disposed in the working fluid passage and extending between the valve body and the gate to form a barrier between the internal working fluid passage and the gate chamber. The internal sealing arrangement includes a frustoconical metal sealing surface adapted to sealingly engage an opposed mating frustoconical metal sealing surface on the valve body to form a first tapered metal-to-metal seal between the sealing arrangement and the valve body.

These and other needs in the art are addressed in another embodiment by a gate valve. In an embodiment, the gate valve comprises a valve body having an internal working fluid passage with a longitudinal axis and an internal gate chamber extending transverse to the working fluid passage. In addition, the gate valve comprises a gate disposed in the internal gate chamber and movable within the gate chamber between a closed position obstructing fluid flow through the working fluid passage and an open position allowing fluid flow through the working fluid passage. Further, the gate valve comprises an internal sealing arrangement coaxially disposed in the working fluid passage and extending between the valve body and the gate to form a barrier between the internal working fluid passage and internal gate chamber. Still further, the gate valve comprises an internal venting passage extending from the internal gate chamber to the internal working fluid passage for selective venting of fluid pressure from the internal gate chamber to the internal working fluid passage.

Thus, embodiments described herein comprise a combination of features and advantages intended to address various shortcomings associated with certain prior devices, systems, and methods. The various characteristics described above, as well as other features, will be readily apparent to those skilled in the art upon reading the following detailed description, and by referring to the accompanying drawings.

BRIEF DESCRIPTION OF THE DRAWINGS

For a detailed description of the preferred embodiments of the invention, reference will now be made to the accompanying drawings. The figures are not necessarily to scale, and certain features and certain views of the figures may be shown exaggerated in scale or in schematic in the interest of clarity and conciseness.

DETAILED DESCRIPTION

Figure 1:
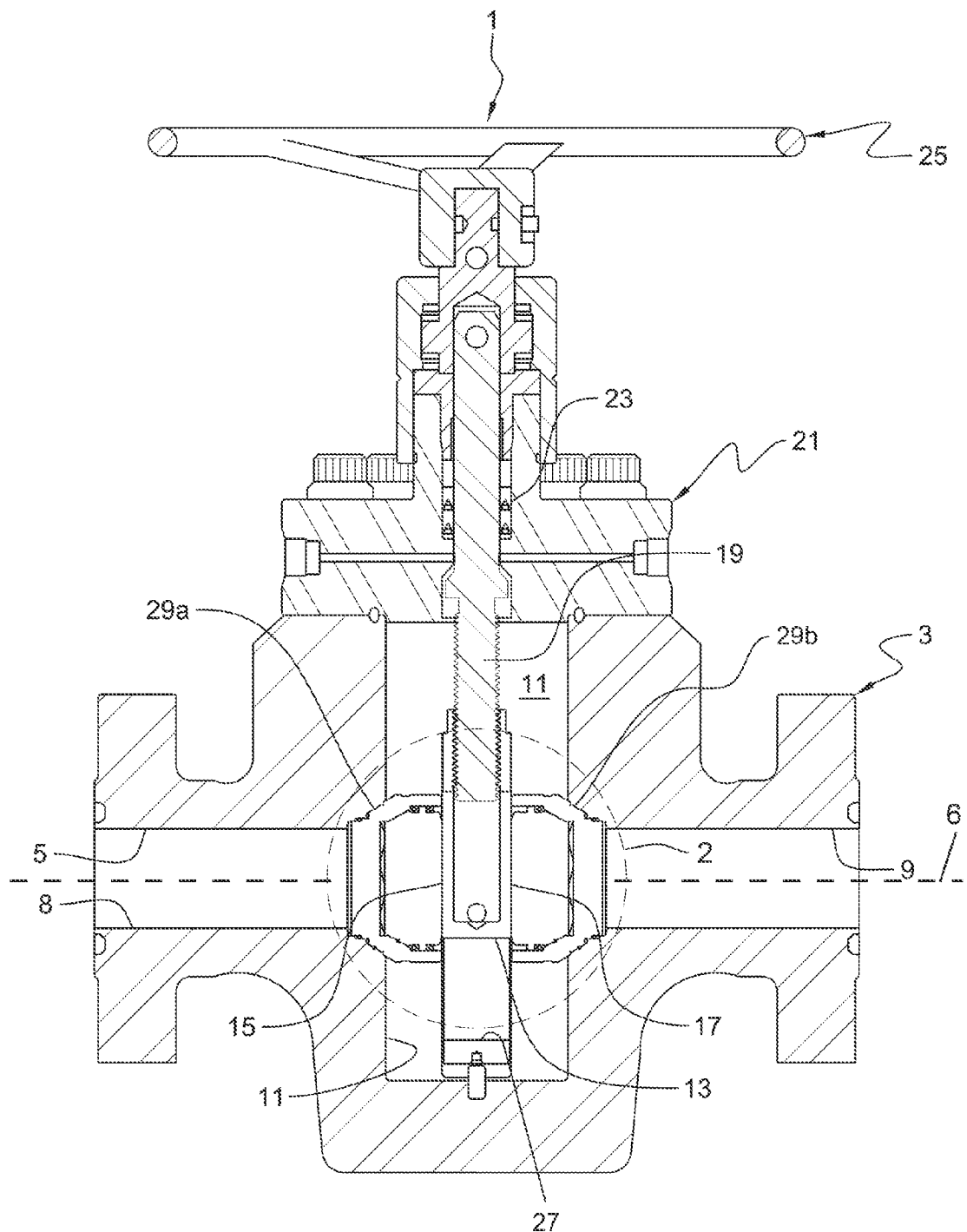
FIG. 1 is a cross-sectional view of an embodiment of a gate valve in accordance with the principles described herein.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

Referring now to FIG. 1, an embodiment of a gate valve 1 includes a valve body 3. An internal working fluid passage 5 having a central or longitudinal axis 6 extends through the valve body 3. The internal working fluid passage 5 comprises an upstream fluid inlet section 8 and a downstream fluid outlet section 9. Passage sections 8, 9 are coaxially aligned with respect to central axis 6. Valve body 3 also includes an internal gate chamber 11 extending perpendicularly across the working fluid passage 5. Specifically, the internal gate chamber 11 is transverse to the internal working fluid passage 5, and intersects the internal working fluid passage 5 such that a lower portion of the internal gate chamber 11 extends below the internal working fluid passage 5 and an upper portion of the internal gate chamber 11 extends above the internal working fluid passage 5. A gate 13 is moveably disposed within the internal gate chamber 11. As will be described in more detail below, the gate 13 is controllably moved within gage chamber 11 between a fully "open" position in which the passage sections 8, 9 are in fluid communication, and a fully "closed" position in which the gate 13 extends across the working fluid passage 5 and obstructs fluid communication through passage 5 between the passage section 8, 9. The gate 13 has an inlet side 15 facing the inlet section 8 and an outlet side 17 facing the outlet section 9. In this embodiment, the gate 13 is generally rectangular. However, in general, the gate (e.g., gate 13) may have any suitable geometry including, without limitation, square, rectangular, circular, oval, hexagonal, etc.

Referring still to FIG. 1, a stem 19 is coupled to the upper end of the gate 13 and controls the position of the gate 13 within the gate chamber 11. An upper end of the stem 19 is received in a bore of a sealing bonnet 21 mounted on the upper end of the valve body 3. Seals 23 are provided between the stem 19 and bonnet 21 to prevent fluid in the internal gate chamber 11 from escaping the valve body 3. The upper end of the stem 19 is coupled to a handle 25, which may be employed to raise or lower the gate 13 within the gate chamber 11, thereby opening and closing the gate valve 1. In this embodiment, the stem 19 is threadably coupled to the gage 13, such that rotation of the handle 25 and the stem 19 in one direction moves the gate 13 upward within the gate chamber 11 relative to the valve body 3 and fluid passage 5, and rotation of the handle 25 and the stem 19 in the opposite the first direction moves the gate 13 downward within the gate chamber 11 relative to the valve body 3 and fluid passage 5. However, in general, any suitable arrangement of moving the stem 19 in a direction transverse to the internal working fluid passage 5 may be used.

The gate 13 has a through bore or fluid passage 27 that is selectively aligned with the internal working fluid passage 5 with the transverse movement of the gate 13 relative to the internal working fluid passage 5. When the gate valve 1 is in the fully "open" position shown in FIG. 2, the gate 13 is positioned such that the fluid passage 27 is aligned with the internal working fluid passage 5 of the valve body 3, thereby allowing fluid communication between the passage sections 8, 9. However, when the gate valve 1 is in the fully "closed" position shown in FIG. 1, the gate 13 is positioned such that the fluid passage 27 of the gate 13 is not aligned with the internal working fluid passage 5 of the valve body 3, thereby restricting and/or preventing fluid communication between the passage sections 8, 9. In particular, in the fully closed position, the gate 13 has sufficient width and height to form a barrier between the inlet section 8 and the outlet section 9, thereby preventing working fluid from flowing from the inlet section 8 to the outlet section 9 via fluid passage 5.

Referring still to FIG. 1, an upstream or inlet internal sealing arrangement 29a is positioned within the fluid passage 5 between the valve body 3 and the inlet side 15 of the gate 13, and a downstream or outlet internal sealing arrangement 29b is positioned within the fluid passage 5 on the opposite side of the gate 13 between the outlet side 17 of the gate 13 and the valve body 3. The internal sealing arrangement 29a forms a barrier between the inlet section 8 and the gate chamber 11, and the internal sealing arrangement 29b forms a barrier between the outlet section 9 and the gate chamber 11. In this embodiment, the internal sealing arrangements 29a, 29b are substantially the same.

Figure 2:
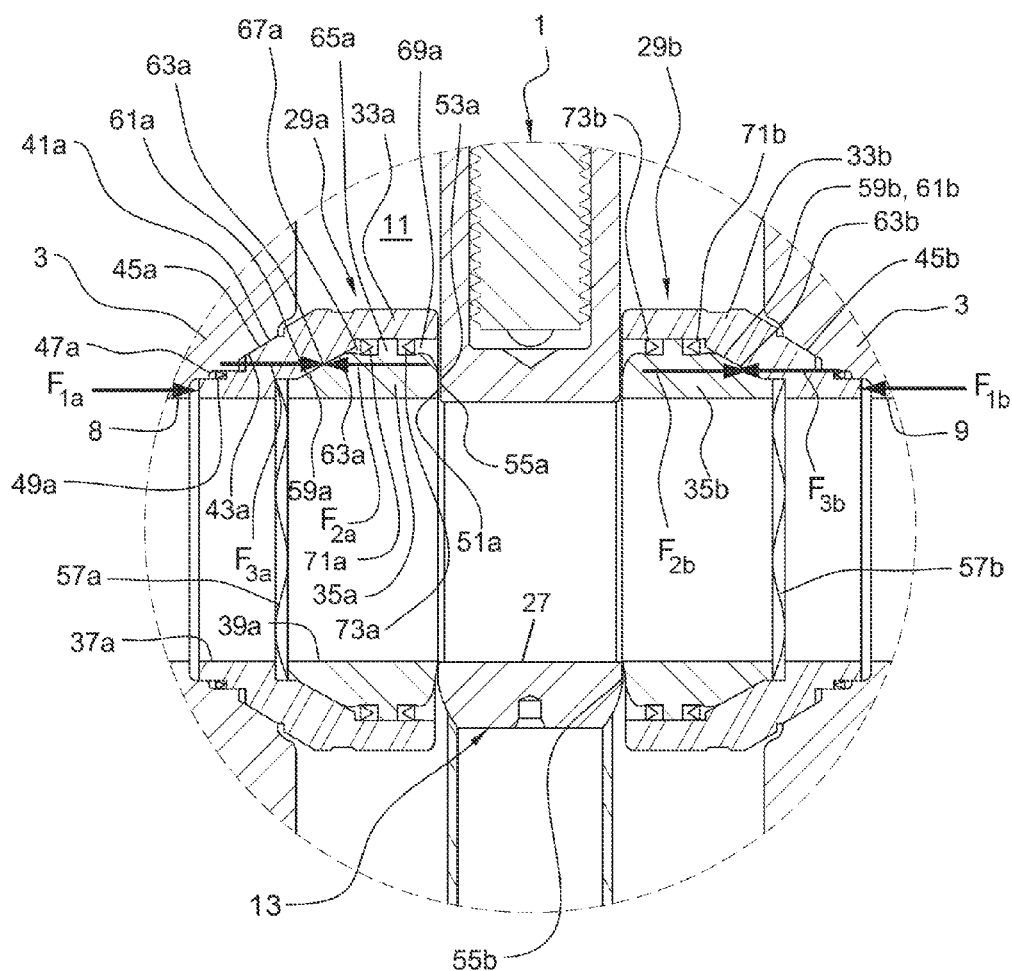
FIG. 2 is an enlarge view of section 2 of FIG. 1.

Referring now to FIG. 2, the upstream internal sealing arrangement 29a will now be described with the understanding that the description of the upstream internal sealing arrangement 29a applies equally to the downstream internal sealing arrangement 29b. The upstream internal sealing arrangement 29a includes a radially outer seat carrier 33a and a radially inner valve seat 35a coaxially disposed within the seat carrier 33a. The outer seat carrier 33a and the inner valve seat 35a are allowed to translate axially relative to each other. In other words, the seat carrier 33a and the valve seat 35a are telescoping. The outer seat carrier 33a translates axially to contact the valve body 3, and the inner valve seat 35a translates axially to contact the gate 13.

The outer seat carrier 33a has a through bore 37a coaxially aligned with the working passage 5, and the inner valve seat 35a has a through bore 39a coaxially aligned with the working passage 5 and the through bore 39a. In addition, the outer seat carrier 33a has an annular tapered (i.e., frustoconical) metal sealing surface 41a disposed along its radially outer surface, and the valve body 3 has a mating annular tapered (i.e., frustoconical) metal sealing surface 43a along its radially inner surface opposite the sealing surface 41a. Under fluid pressure, the sealing surfaces 41a, 43a sealingly engage to form a high-pressure annular tapered metal-to-metal seal 45a between the valve body 3 and the outer seat carrier 33a. Unlike conventional gate valves that include an annular planar seal with the valve body, embodiments described herein that include annular tapered seals with the valve body (e.g., the annular tapered seal 45a) offer the potential for improved durability by allowing debris disposed between the mating tapered sealing surfaces to be more easily flushed away.

To form a metal-to-metal seal between flat tapers or non-self-locking tapers (e.g., the annular tapered seal 45a between the mating tapered sealing surfaces 41a, 43a), the sealing surfaces are preferably capable of making intimate contact with each other and have very smooth surface finishes. The sealing surfaces are typically ground to a mirror finish. In addition, a hardened surface coating, such as carbide, may be applied on the sealing surfaces prior to grinding to improve finish and wear resistance. Surface finish is not as critical when the metal-to-metal seal is formed by a self-lock taper, as will be later described.

Referring still to FIG. 2, an annular space or seal gland 47a is disposed between the outer seat carrier 33a and the valve body 3. In this embodiment, the seal gland 47a is formed by opposed annular recesses on the outer seat carrier 33a and the valve body 3. An annular seal 49a is disposed about the outer seat carrier 33a in the seal gland 47a, and sealingly engages the outer seat carrier 33a and the valve body 3. In this embodiment, the seal 49a is a low pressure seal, such as a non-metal-to-metal seal. Further, in this embodiment, the seal 49a is a unidirectional seal that restricts and/or prevents fluid from flowing between the valve body 3 and the seat carrier 33a from the inlet section 8 to the internal gate chamber 11, but allows fluid to flow in the opposite direction (i.e., allows fluid to flow between the valve body and the seat carrier 33a from the gate chamber 11 to the inlet section 8).

The downstream end of the inner valve seat 35a has an annular metal sealing surface 51a, and the gate 3 has a mating metal sealing surface 53a opposite the sealing surface 51a. Under fluid pressure, the metal sealing surfaces 51a, 53a engage to form a high-pressure metal-to-metal annular seal 55a. In this embodiment, the sealing surfaces 51a, 53a are planar, and thus, the metal-to-metal seal 55a is planar. However, in other embodiments, the seal between the valve seat and the gate (e.g., metal-to-metal seal 55a) may have a different geometry (e.g., tapered or frustoconical).

Referring still to FIG. 2, a spring 57a is axially disposed between the inner valve seat 35a and the outer seat carrier 33a. The spring 57a is configured to exert axial forces on the inner valve seat 35a and the outer seat carrier 33a that urge the inner valve seat 35a and the outer seat carrier 33a axially apart. Thus, on the inlet side, the spring 57a exerts an axial force on the inner valve seat 35a that urges the inner valve seat 35a against the gate 13, and exerts an equal and opposite axial force on the outer valve seat 35a that urges the outer seat carrier 33a against the valve body 3, thereby reinforcing the metal-to-metal seals 55a, 45a, respectively. Similarly, on the outlet side, the spring 57b (of the internal sealing arrangement 29b) exerts an axial force on the outer seat carrier 33b that urges the outer seat carrier 33b against the valve body 3, and exerts an equal and opposite axial force on the inner valve seat 35b that urges the inner valve seat 35b against the gate 13, thereby reinforcing the metal-to-metal seals 45b, 55b, respectively.

The outer seat carrier 33a has an inner annular tapered (i.e., frustoconical) metal sealing surface 59a disposed along its radially inner surface, and the inner valve seat 35a has a mating outer annular tapered (i.e., frustoconical) metal sealing surface 61a disposed along its radially outer surface opposite the sealing surface 59a. When seat carrier 33a and valve seat 35a are urged axially apart by spring 57a and/or fluid pressure, sealing surfaces 59a, 61a do not sealingly engage.

Referring still to FIG. 2, the radially outer surface of the inner valve seat 35a includes a radially extending annular shoulder 65a that extends to the outer seat carrier 33a. A pair of annular spaces or seal glands 67a, 69a are radially positioned between the inner valve seat 35a and the outer seat carrier 33a on opposite sides of the annular seal shoulder 65a. An annular seal 71a, 73a is disposed in each seal gland 67a, 69a, respectively. In this embodiment, the seals 71a, 73a are low pressure seals, such as a non-metal-to-metal seals. Further, in this embodiment, the seals 71a, 73a are unidirectional seals that are oppositely oriented relative to the shoulder 65a so that they seal in different directions. Specifically, the seal 71a functions to restrict and/or prevent fluid in the working fluid passage 5 from flowing between the seat carrier 33a and the valve seat 35a into the gate chamber 11, and the seal 73a functions to restrict and/or prevent fluid within the gate chamber 11 from flowing between the seat carrier 33a and the valve seat 35a into the working fluid passage 5.

When the gate valve 1 is in the fully open position as shown in FIG. 2, working fluid flows through the internal working fluid passage 5 and fills the internal sealing arrangements 29a, 29b. As a result, fluid pressure within the internal sealing arrangements 29a, 29b increases until a steady state is achieved. Area differentials between the exposed portions of the seat carrier 33a, 33b and the valve seat 35a, 35b, respectively, cause the internal sealing arrangements 29a, 29b, respectively, to telescope into sealing engagement with the gate 13 and the valve body 3 as the fluid pressure within the working passage 5 increases. In particular, prior to fluid flow through the working passage 5, the springs 57a, 57b bias the seat carriers 33a, 33b, respectively, against the valve body 3 to form the seals 45a, 45b, respectively, and bias the valve seats 35a, 35b, respectively, against the gate 13 to form seals 55a, 55b, respectively. Thus, when fluid initially begins to flow through the working passage 5, seals 45a, 55a are formed, and the seat carrier 33a, 33b and the valve seat 35a, 35b, respectively, are urged apart into sealing engagement with the valve body 3 and the gate 13, respectively. As the fluid flows through the working passage 5 and the fluid pressure therein increases, seals 45a, 45b, 55a, 55b are reinforced by the forces exerted by the pressurized fluid. Specifically, a portion of the pressurized fluid in the working passage 5 flows between each seat carrier 33a, 33b and the valve body 3 to the seal 49a, 49b, respectively, which restricts and/or prevents the pressurized fluid from flowing further towards the gate chamber 11. The pressurized fluid between the valve body 3 and the seat carrier 33a, 33b generates an axial force F1a, F1b, respectively, that urges the seat carrier 33a, 33b, respectively, towards the inner valve seat 35a, 35b, respectively.

Since each seat carrier 33a, 33b and its corresponding valve seat 35a, 35b, respectively, are urged apart by the springs 57a, 57b, respectively, a portion of the fluid in the working passage 5 flows between each seat carrier 33a, 33b and its corresponding valve seat 35a, 35b, respectively, to the seal 71a, 71b, respectively, which restricts and/or prevents the pressurized fluid from flowing further towards the gate chamber 11. The pressurized fluid between each seat carrier 33a, 33b and its corresponding valve seat 35a, 35b, respectively, generates an axial force F2a, F2b that urges each seat carrier 33a, 33b away from its corresponding valve seat 35a, 35b, respectively, and generates an equal and opposite axial force F3a, F3b that urges each valve seat 35a, 35b away from its corresponding seat carrier 33a, 33b, respectively.

As previously described and shown in FIG. 2, the axial force F1a, F1b operates to break the sealing engagement between the seat carrier 33a, 33b, respectively, and the valve body 3. However, the axial forces F2a, F3a operate to maintain (a) sealing engagement between the seat carrier 33a and the valve body 3, and (b) sealing engagement between the valve seat 35a and the gate 13; and the axial forces F2b, F3b operate to maintain (a) sealing engagement between the seat carrier 33b and the valve body 3, and (b) sealing engagement between the valve seat 35b and the gate 13. In this embodiment, the seat carriers 33a, 33b, the seals 49a, 49b, the seals 71a, 71b, and the valve seats 35a, 35b are sized and configured such that the axial force F2a is greater than the axial force F1a, and the axial force F2b is greater than the axial force F1b. In particular, the geometry and surface areas of the surfaces contacting the pressurized fluid between the valve body 3 and each seat carrier 33a, 33b, and the pressurized fluid between each seat carrier 33a, 33b and its corresponding valve seat 35a, 35b, respectively, are sized such that the axial force F2a, F2b is greater than force F1a, F1b, respectively. The net effect is that the pressurized fluid flowing through working passage 5 urges each seat carrier 33a, 33b against the valve body 3, thereby reinforcing the seal 45a, 45b, respectively, and urges each valve seat 35a, 35b against the gate 13, thereby reinforcing the seal 55a, 55b, respectively. Thus, the pressurized fluid flowing through the working passage 5 reinforces the seals 45a, 55a initially formed by the spring 57a, and reinforces the seals 45b, 55b initially formed by spring 57b. Although the axial forces generated by the pressurized fluid (e.g., forces F1a, F1b, F2a, F2b, F3a, F3b) are substantially greater than the axial forces generated by the springs 57a, 57b, the springs 57a, 57b continue to urge each seat carrier 33a, 33b and its corresponding valve seat 35a, 35b, respectively, apart.

When the gate valve 1 is in the fully closed position shown in FIG. 1, fluid pressure increases within the upstream sealing arrangement 29a as working fluid fills up the upstream sealing arrangement 29a from the inlet section 8, and fluid pressure decreases within the downstream sealing arrangement 29b as working fluid flows out of downstream sealing arrangement 29b through outlet section 9. For the same reasons as previously described, area differentials between the portions of the seat carrier 33a and the valve seat 35a that contact the pressurized fluid, cause the internal sealing arrangement 29a to telescope into sealing engagement with the gate 13 and the valve body 3 as the fluid pressure within the inlet section 8 increases. The spring 57a also continues to urge the inner valve seat 35a against the gate 13 and urge the outer seat carrier 33a against the valve body 3, thereby reinforcing the metal-to-metal seals 55a, 45a, respectively. In the event the seal member 71a fails, working fluid from the inlet section 8 will flow between the seat carrier 33a and the valve seat 35a into the internal gate chamber 11. However, outlet sealing arrangement 29b restricts and/or prevents the fluid in internal gate chamber 11 from reaching the outlet section 9. In particular, even without substantial fluid pressure in the outlet section 9, the spring 57b urges the seat carrier 33b and the valve seat 35b apart and into sealing engagement with the valve body and the gate 13, respectively. In addition, the seal member 73b restricts and/or prevents the fluid in the internal gate chamber 11 from flowing between the seat carrier 33b and the valve seat 35b into the outlet section 9. Moreover, the resulting pressure differential across the gate 13 (i.e., the pressure differential between the inlet section 8 and the outlet section 9) urges the gate 13 against the valve seat 31b, thereby compressing the internal sealing arrangement 29b and the spring 57b, which enhances the sealing engagement at the seals 55b and 45b. As the pressure in internal gate chamber 11 increases, it exerts increasing axial forces on the seal member 73b, which urges valve seat 31b axially into seat carrier 33b. When the axial forces acting on valve seat 35b and seat carrier 33b are sufficient to fully compress spring 57b, the metal-to-metal tapered seal 103b is formed Referring now to FIG. 3, another embodiment of a gate valve 81 in the fully closed position is shown. Gate valve 81 is substantially the same as gate valve 1 previously described except that gate valve 81 include a self-locking metal-to-metal seal between the valve body 97 and each internal sealing arrangement 83a, 83b instead of the tapered metal-tometal seals 45a, 45b previously described, and further, does not include a unidirectional seal (e.g., seal 49a, 49b) between the valve body 97 and each sealing arrangement 83a, 83b. Only the internal sealing arrangement 83a on the upstream or inlet side will be described in detail, it being understood that the internal sealing arrangement 83b on the downstream or outlet side is the same.

Figure 3:
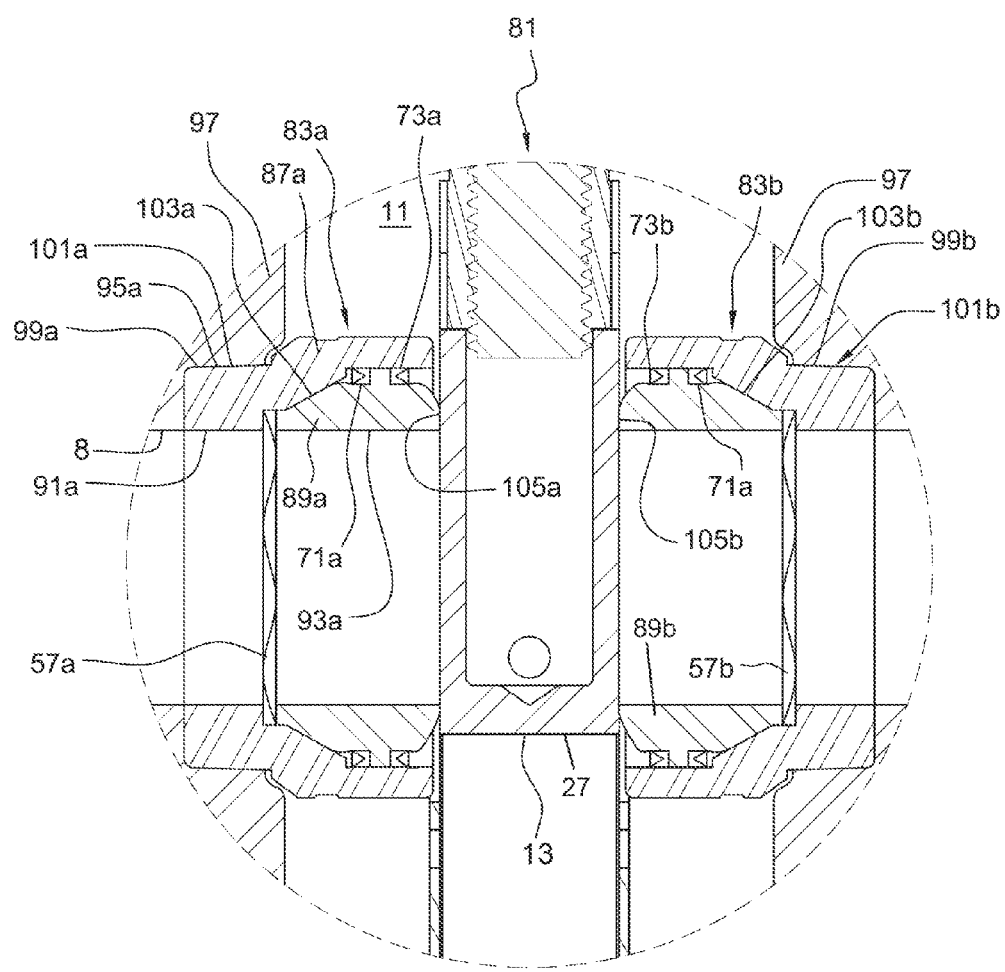
FIG. 3 is an enlarged partial cross-sectional view of an embodiment of a gate valve in accordance with the principles described herein.

The internal sealing arrangement 83a includes a radially outer seat carrier 87a and a radially inner valve seat 89a. The seat carrier 87a has a through bore 91a coaxially aligned with the inlet section 8, and the valve seat 89a has a through bore 93a coaxially aligned with the inlet section 8. As shown in FIG. 3, the inner valve seat 89a is the same as the inner valve seat 35a previously described. However, in this embodiment, the seat carrier 87a includes a self-locking annular tapered (i.e., frustoconical) surface 95a disposed on the radially outer surface of the seat carrier 87a, and the valve body 97 has a mating annular tapered (i.e., frustoconical) metal surface 99a along its radially inner surface opposite the tapered surface 95a. The taper angle of the self-locking metal tapered surface 95a and the tapered surface 99a are preferably the same and relatively small. In particular, the taper angle of the self-locking metal tapered surface 95a and the mating tapered surface 99a are preferably each less than 10°, and more preferably, each less than or equal to 3°. The self-locking tapered surface 95a engages the tapered surface 99a via an interference fit, thereby creating an annular tapered metal-to-metal seal 101a that is active both under low pressure and high pressure. Due to the interference fit, the seat carriers 87a, 87b will typically be removed from the valve body 97 by a hydraulic puller assembly when necessary.

As with the gate valve 1 previously described, the internal sealing arrangement 83a allows up to three annular metal-to-metal seals to be formed, one between the outer seat carrier 87a and the valve body 97 at 101a, one between the outer seat carrier 87a and the inner valve seat 89a at 103a, and one between the inner valve seat 89a and the gate 13 at 105a. The internal sealing arrangement 83b also provides up to three annular metal-to-metal seals at locations 101b, 103b, and 105b.

The gate valve 81 functions similarly to the gate valve 1 previously described. Namely, spring 57a urges the seat carrier 87a and the valve seat 89a apart, and spring 57b urges the seat carrier 87b and the valve seat 89b apart. When the gate 13 is in the open position, area differentials between the exposed portions of the seat carrier 87a, 87b and the valve seat 89a, 89b, respectively, cause the internal sealing arrangements 83a, 83b, respectively, to telescope into sealing engagement with the gate 13 and the valve body 3 as the fluid pressure within the working passage 5 increases. The telescoping of each sealing arrangement 83a, 83b enhances the seals 105a, 105b, respectively. The interference fit between each seat carrier 87a, 87b and the valve body 97 as well as the telescoping of each sealing arrangement 83a, 83b enhances the seals 101a, 101b, respectively. The seals 105a, 105b restrict and/or prevent fluid in the working passage 5 from flowing between the gate 13 and the valve seat 89a, 89b, respectively, to the gate chamber 11, and the seals 101a, 101b, restrict and/or prevent fluid in the working passage 5 from flowing between the valve body 97 and the seat carrier 87a, 87b, respectively, to the gate chamber 11. Each unidirectional seal 71a, 71b restricts and/or prevents fluid in the working passage from flowing between each seat carrier 87a, 87 and its corresponding valve seat 89a, 89b, respectively, to the gate chamber 11.

When the gate valve 81 is in the fully closed position, fluid pressure increases within the upstream sealing arrangement 83a as working fluid fills up the upstream sealing arrangement 83a from the inlet section 8, and fluid pressure decreases within the downstream sealing arrangement 83b as working fluid flows out of downstream sealing arrangement 83b through outlet section 9. For the same reasons as previously described, the pressurized fluid causes the internal sealing arrangement 83a to telescope into sealing engagement with the gate 13 and the valve body 3 as the fluid pressure within the inlet section 8 increases. The spring 57a also continues to urge the inner valve seat 89a against the gate 13 and urge the outer seat carrier 87a against the valve body 3, thereby reinforcing the seals 55a, 45a, respectively. In the event the seal member 71a fails, working fluid from the inlet section 8 will flow between the seat carrier 87a and the valve seat 89a into the internal gate chamber 11. However, outlet sealing arrangement 83b restricts and/or prevents the fluid in internal gate chamber 11 from reaching the outlet section 9. In particular, even without substantial fluid pressure in the outlet section 9, the spring 57b urges the seat carrier 87b and the valve seat 89b axially apart and into sealing engagement with the valve body 97 and the gate 13, respectively. In addition, the seal member 73b restricts and/or prevents the fluid in the internal gate chamber 11 from flowing between the seat carrier 87b and the valve seat 89b into the outlet section 9. Moreover, the resulting pressure differential across the gate 13 (i.e., the pressure differential between the inlet section 8 and the outlet section 9) urges the gate 13 against the valve seat 89b, thereby compressing the internal sealing arrangement 83b and the spring 57b, which enhances the sealing engagement at the seals 105b and 101b. As the pressure in internal gate chamber 11 increases, it exerts increasing axial forces on the seal member 73b, which urges valve seat 89b axially into seat carrier 87b. When the axial forces acting on valve seat 89b and seat carrier 87b are sufficient to fully compress spring 57b, the metal-to-metal tapered seal 103b is formed.

Figure 4:
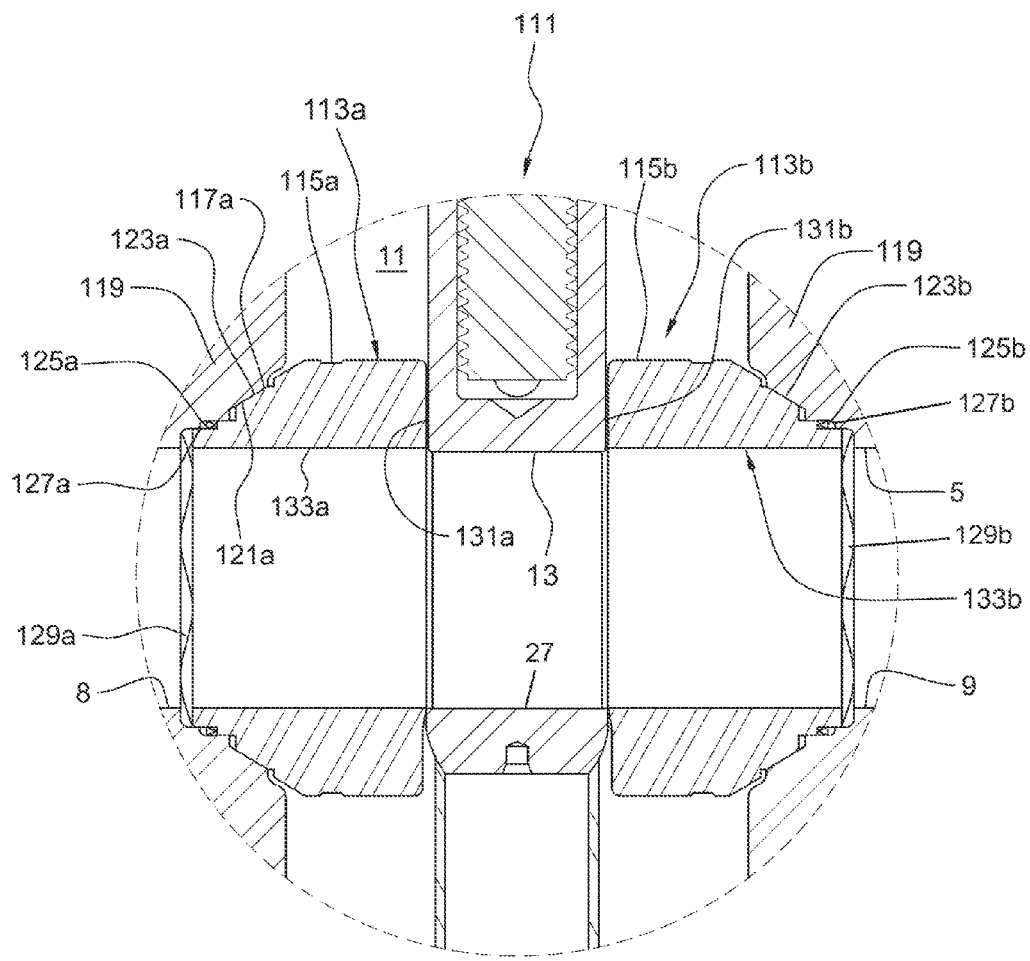
FIG. 4 is an enlarged partial cross-sectional view of an embodiment of a gate valve in accordance with the principles described herein.

Referring now to FIG. 4, another embodiment of a gate valve 111 in the fully open position is shown. Gate valve 111 is similar to gate valve 1 previously described except that each internal sealing arrangement 113a, 113b is a single-piece design. Only the internal sealing arrangement 113a on the upstream or inlet side will be described in detail, it being understood that the internal sealing arrangement 113b on the downstream or outlet side is the same.

The internal sealing arrangement 113a comprises a single piece valve seat 115a, but does not include a separate and distinct seat carrier. Thus, internal sealing arrangement 113a is not a telescoping sealing arrangement such as arrangements 29a, 83a previously described. The valve seat 115a has a bore 133a that is coaxially aligned with the working fluid passage 5. In addition, the valve seat 115a has an annular tapered (i.e., frustoconical) metal sealing surface 117a disposed on its radially outer surface, and the valve body 119 has a mating annular tapered (i.e., frustoconical) metal sealing surface 121a disposed on its radially inner surface opposite the sealing surface 117a. When the tapered metal sealing surfaces 117a, 121a are urged together and sealingly engage, an annular high-pressure metal-to-metal seal 123a is formed therebetween.

An annular seal member 125a is disposed in an annular space or seal gland 127a between the valve seat 115a and the valve body 119. In this embodiment, the seal member 125a is a low pressure seal, e.g., a non-metal-to-metal seal. Further, in this embodiment, the seal member 125a is a unidirectional seal that restricts and/or prevents working fluid from flowing between the valve body 119 and the valve seat 115a from the gate chamber 11 to the inlet passages 8 and 9 when the metal-to-metal seals 123a, 123b, respectively, are not active.

A spring 129a is axially positioned between the valve seat 115a and the valve body 119, and applies an axial force to the valve seat 115a that urges the valve seat 115a against the gate 13 to form an annular metal-to-metal seal 131a between the valve seat 115a and gate 13. Likewise, a spring 129b urges the valve seat 115b against the gate 13 to form an annular metal-to-metal seal 131a.

When the gate valve 111 is in the fully opened position, the working fluid will flow through the internal working fluid passage 5 from the inlet section 8 to the outlet section 9. Initially, each spring 129a, 129b urges its corresponding valve seat 115a, 115b, respectively, against the gate 13, thereby forming the seals 131a, 131b, respectively. Pressurized fluid in the passage 5 may flow between the valve seat 115a, 115b and the valve body 119 to the seal 125a, 125b, respectively, and generates axial forces that urge the valve seats 115a, 115b against the gate 13, thereby enhancing seals 131a, 131b, respectively. Since the seals 131a, 131b are initially formed by the springs 129a, 129b, respectively, working fluid is restricted and/or prevented from flowing between the valve seat 115a, 115b and the gate 13, and thus, the working fluid does not exert an axial force on the valve seat 115a, 115b urging it away from the gate 13. In the event the seal member 125a, 125b fails, the working fluid is free to flow between the valve seat 115a, 115b and the valve body 119 into the gate chamber 11.

When the gate valve 111 is in the fully closed position, working fluid fills the valve seat 115a and the fluid pressure in the valve seat 115a increases. The spring 129a and the pressurized fluid between the valve seat 115a and the valve body 119 urge the valve seat 115a against the gate 13, thereby maintaining sealing engagement of the valve seat 115a and the gate 13 at the seal 131a. However, pressurized fluid may flow past the low pressure seal member 125a from the working passage 5 to the gate chamber 11. However, fluid in the gate chamber 11 is restricted and/or prevented from flowing into outlet section 9 by metal-to-metal seals 131b, 123b. In particular, the pressure differential across the gate 13 (i.e., the pressure differential between the inlet section 8 and the outlet section 9) urges the gate 13 against the valve seat 115b, thereby enhancing seal 131b, compressing the spring 129b, and forming the seal 123b between the valve seat 115b and the valve body 119.

In this embodiment, the gate valve 111 is simplified compared to the gate valves 1, 81 previously described in that there are fewer moving parts (e.g., the valve seat 115a, 115b is a unitary, monolithic, single-piece component and is not telescoping). Further, since fluid is permitted to enter the gate chamber 11 in this embodiment, the double blocking effect is minimized, and thus, the torque requirements to transition the gate valve 111 between the closed and opened positions is reduced. However, since working fluid is allowed to enter the gate chamber 11, the gate valve 111 permits exposure of the internal gate chamber 11 to working fluid, which may be corrosive.

Figure 5:
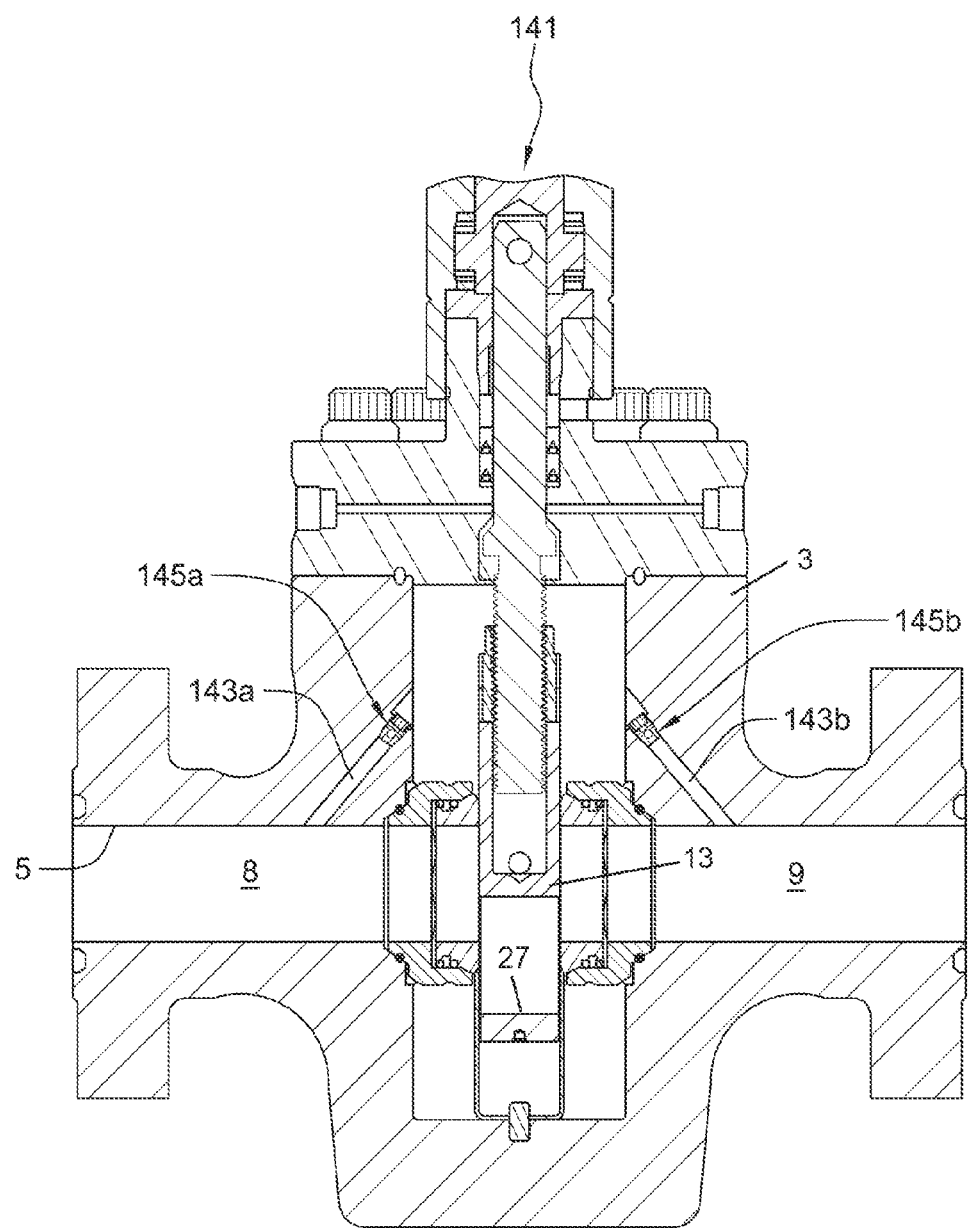
FIG. 5 is a cross-sectional view of an embodiment of a gate valve including internal venting passages and valves in accordance with the principles described herein.
Figure 6:
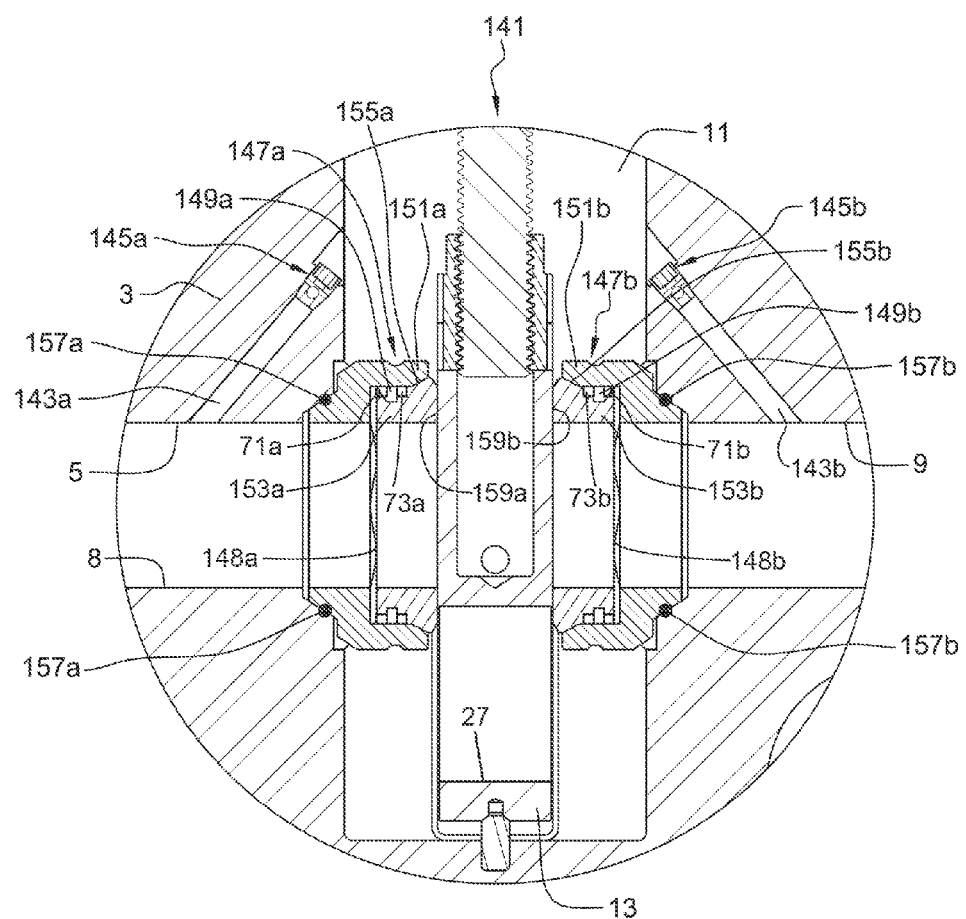
FIG. 6 is an enlarged partial cross-sectional view of the gate valve of FIG. 5.

Referring now to FIGS. 5 and 6, another embodiment of a gate valve 141 in the partially open position is shown. Gate valve 141 is substantially the same as gate valve 1 previously described except that the gate valve 141 includes internal venting passages 143a, 143b, each internal sealing arrangements 147a, 147b, and the metal-to-metal seals 155a, 155a between the seal carrier 151a,151b, respectively, and the valve seat 153a, 153b, respectively, is axially disposed between the gate 13 and the low pressure seal 149a, 149b, respectively.

Venting passages 143a, 143b connect the internal gate chamber 11 to the inlet and outlet passage sections 8, 9, respectively. In this embodiment, the internal venting passages 143a, 143b allow fluid pressure to be vented from the internal gate chamber 11 into the inlet and outlet passage sections 8, 9, respectively. However, in other embodiments, the internal venting passage 143a may be omitted such that fluid pressure is vented only from the internal gate chamber 11 to the outlet passage section 9. A valve 145a, 145b is positioned in each internal venting passage 143a, 143b, respectively, to control venting of the fluid pressure from the internal gate chamber 11 to the inlet and outlet passage sections 8, 9, respectively. Conventional gate valves without such internal venting passages typically require the operator to vent the trapped fluid pressure to a local working environment, which could result in exposure of the operator and local working environment to potentially harmful fluids. However, by venting the fluid pressure in the internal gate chamber 11 into a controlled environment in the internal working fluid passage 5, embodiments described herein offer the potential to avoid such safety and environmental risks.

As best shown in FIG. 6, the internal sealing arrangements 147a, 147b are similar the internal sealing arrangements 29a, 29b previously described, with two exceptions. Namely, in each internal sealing arrangements 147a, 147b, D-rings 149a, 149b, respectively, define the annular shoulder between opposed unidirectional seals 71a, 73a and 71b, 73b, respectively. In this embodiment, the unidirectional seals 71a, 73a and 71b, 73b are low-pressure seals, e.g., non-metal-to-metal seals. The unidirectional seals 71a, 73a and 71b, 73b may be arranged to prevent fluid in the gate chamber 11 from entering the internal working fluid passage 5 as previously described. In addition, the metal-to-metal seal 155a between the valve seat 155a and the seal carrier 153a is downstream of the seal 149a, and the metal-to-metal seal 155b between the valve seat 155b and the seal carrier 153b is upstream of the seal 149b. Whereas the opposite is true for the internal sealing arrangements 29a, 29b shown in FIG. 2, where the metal-to-metal seal 63a is positioned upstream of the opposed seals 71a, 73a, and the metal-to-metal seal 63b is positioned downstream of the opposed seals 71b, 73b.

When the gate valve 141 is open, the internal sealing arrangements 147a, 147b function the same as the sealing arrangements 29a, 29b previously described. Namely, the sealing arrangements 147a, 147b restrict and/or prevent fluid in the working passage 5 from flowing into the gate chamber 11 as the sealing arrangements 147a, 147b telescope into sealing engagement with the gate 13 and the valve body 3 due to the combined effects of the springs 148a, 148b and area differentials between the portions of the seat carrier 151a, 151b and the valve seat 153a, 153b, respectively, that contact the pressurized fluid—the metal-to-metal tapered seals 157a, 157b restrict and/or prevent fluid from flowing between the valve body 3 and the seat carriers 151a, 151b, respectively, to the gate chamber 11; the metal-to-metal seals 159a, 159b restrict and/or prevent fluid from flowing between the gate 13 and the valve seats 153a, 153b, respectively, to the gate chamber 11; and the seals 71a, 73a and seals 71b, 73b restrict and/or prevent fluid from flowing between the valve seats 153a, 153b and the seat carriers 151a, 151b, respectively, to the gate chamber 11.

When the gate valve 141 is in the fully closed position shown in FIG. 6, fluid pressure increases within the upstream sealing arrangement 147a as working fluid fills up the upstream sealing arrangement 147a from the inlet section 8, and fluid pressure decreases within the downstream sealing arrangement 147b as working fluid flows out of downstream sealing arrangement 147b through outlet section 9. For the same reasons as previously described, area differentials between the portions of the seat carrier 151*a* and the valve seat 153*a* that contact the pressurized fluid, cause the internal sealing arrangement 147*a* to telescope into sealing engagement with the gate 13 and the valve body 3 as the fluid pressure within the inlet section 8 increases. The spring 148*a* also continues to urge the inner valve seat 153*a* against the gate 13 and urge the outer seat carrier 151*a* against the valve body 3, thereby reinforcing the metal-to-metal seals 157*a*, 159*a*, respectively. In the event the seal member 71*a* fails, working fluid from the inlet section 8 will flow between the seat carrier 151*a* and the valve seat 153*a* into the internal gate chamber 11. However, outlet sealing arrangement 147*b* restricts and/or prevents the fluid in internal gate chamber 11 from reaching the outlet section 9. In particular, even without substantial fluid pressure in the outlet section 9, the spring 148*b* urges the seat carrier 151*b* and the valve seat 153*b* apart and into sealing engagement with the valve body 3 and the gate 13, respectively, to form seals 157*b*, 159*b*, respectively. In addition, the seal member 73*b* restricts and/or prevents the fluid in the internal gate chamber 11 from flowing between the seat carrier 151*b* and the valve seat 153*b* into the outlet section 9. Further, the resulting pressure differential across the gate 13 (i.e., the pressure differential between the inlet section 8 and the outlet section 9) urges the gate 13 against the valve seat 153*b*, thereby compressing the internal sealing arrangement 147*b* and the spring 148*b*, which enhances the sealing engagement at the seals 159*b* and 157*b*. As the pressure in internal gate chamber 11 increases, it exerts increasing axial forces on the seal member 73*b*, which urges valve seat 153*b* axially into seat carrier 151*b*. When the axial forces acting on valve seat 153*b* and seat carrier 151*b* are sufficient to fully compress spring 148*b*, the metal-to-metal tapered seal 155*b* is formed. If desired, in this embodiment, any leakage into the gate chamber 11 from the inlet section 8 past the seal 149*a* and/or any residual pressure trapped within the internal gate chamber 11 may be communicated to the outlet section 9 and bypass the outlets sealing arrangement 147*b* via the internal venting passage 143*b* and the valve 145*b*.

Figure 7:
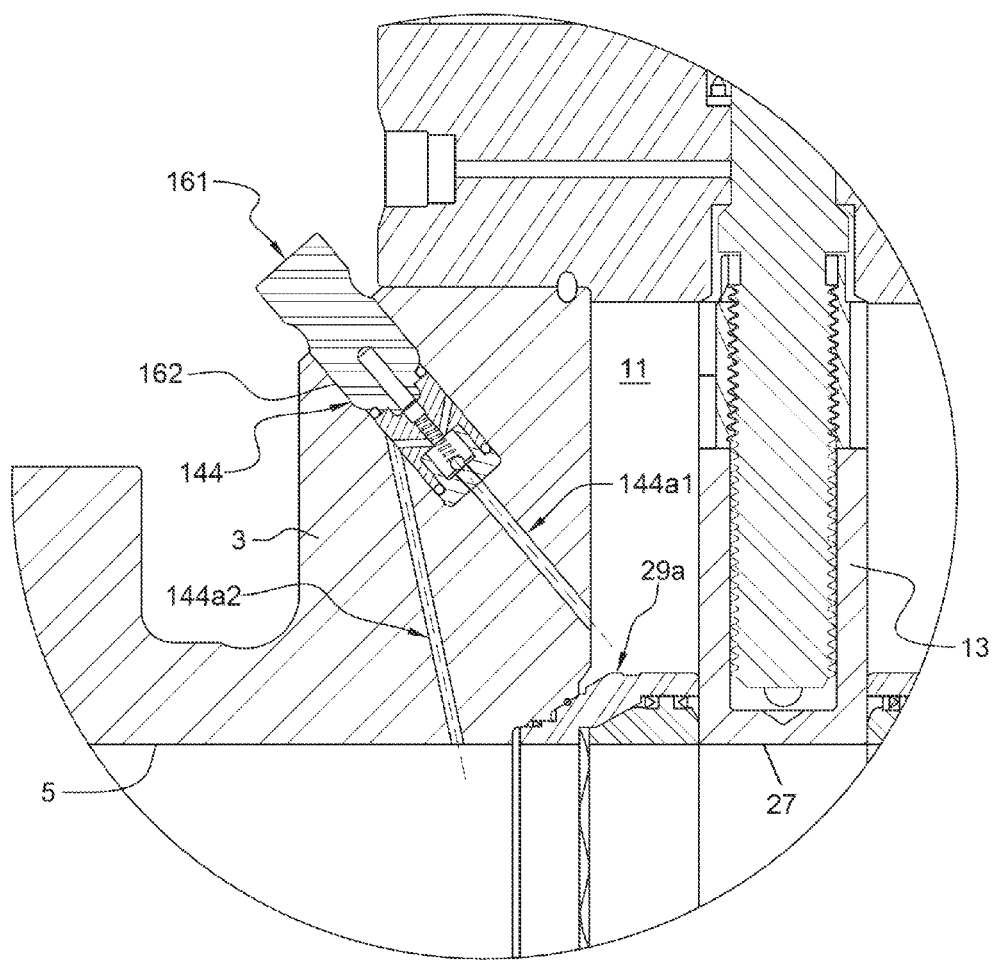
FIG. 7 is an enlarged partial cross-sectional view of an embodiment of a gate valve including multi-branched internal venting passages in accordance with the principles described herein.

As shown in FIGS. 5 and 6, the internal venting passage 143*a* extends from the internal gate chamber 11, through the valve body 3, to the inlet section 8. Similarly, the internal venting passage 143*b* extends from the internal gate chamber 11, through the valve body 3, to the outlet section 9. However, alternative venting configurations are possible. For example, referring now to FIG. 7, an embodiment of an internal venting arrangement 144 is shown. Internal venting arrangement 144 includes an internal valve 161 disposed in a bore 162 extending from the external surface of the valve body 3, a first branch or passage 144*a*1 that extends from the internal gate chamber 11 to the bore 162 and the internal valve 161, and a second branch or passage 144*a*2 that extends from the inlet section 8 to the bore 162 and the internal valve 161. In this embodiment, the first and second passages 143*a*1, 143*a*2 are not coaxially aligned. At a predetermined pressure differential between the gate chamber 11 and the inlet passage section 8, the valve 161 will open and allow fluid from the internal gate chamber 11 through the branch 144*a*1 and into the inlet section 8 through the branch 144*a*2. A similar venting passage design may be used to provide controlled fluid communication between the gate chamber 11 and the outlet section 9.

Although the venting passages 143*a*, 143*b* previously described are shown in the gate valve 141 including the internal sealing arrangements 147*a*, 147*b*, and the branched venting arrangement 144 is shown in the gate valve 1 including the internal sealing arrangements 29*a*, 29*b*, in general, embodiments of venting passages (e.g., 143*a*, 143*b*, 144, etc.) may be employed in gate valves comprising any type of internal sealing arrangement (e.g., internal sealing arrangements 29*a*, 29*b*, 83*a*, 83*b*, etc.).

Figure 8:
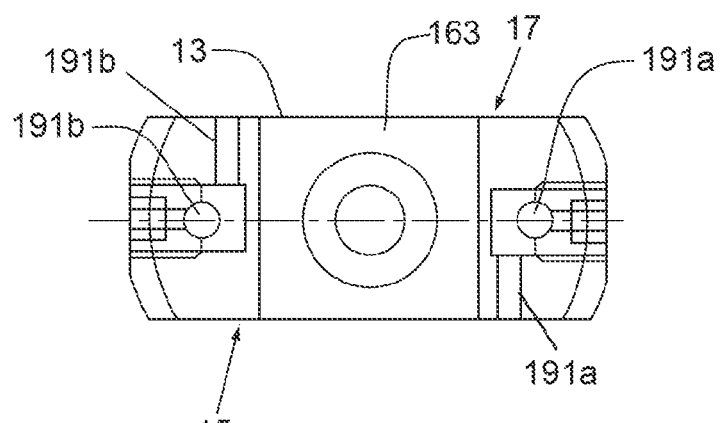
FIG. 8 is a top view of an embodiment of a gate including venting passages in accordance with the principles described herein.
Figure 9:
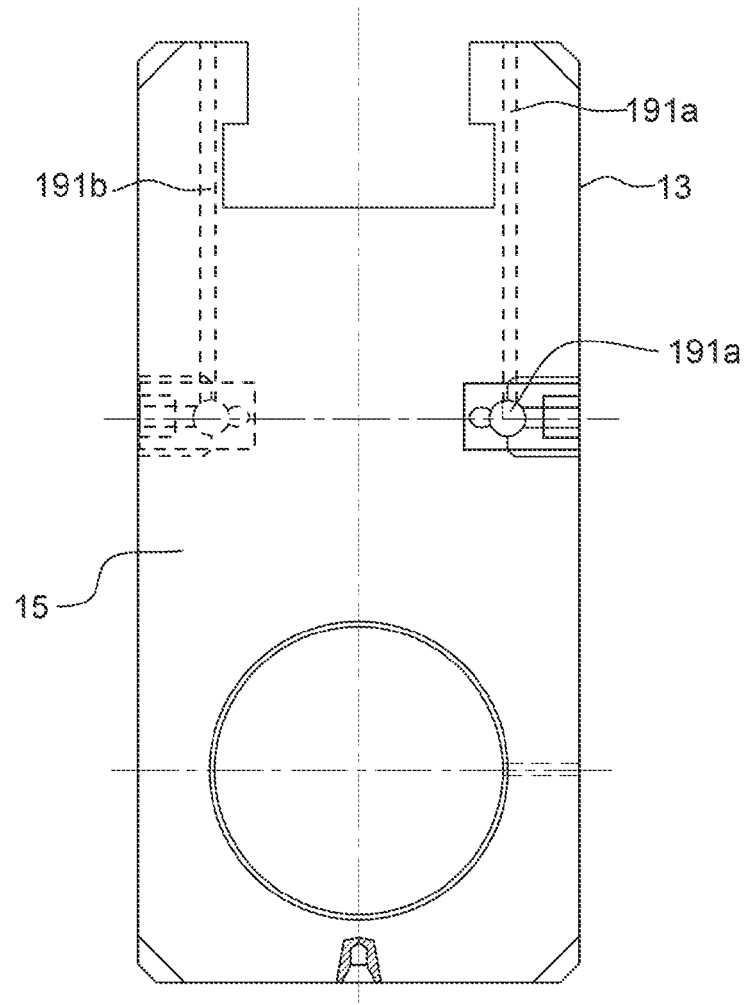
FIG. 9 is a front view of the gate of FIG. 8.

Referring now to FIGS. 8 and 9, the internal venting passages may also be located in the gate 13. In this embodiment, the gate 13 includes a first venting passage 191*a* that extends through the gate valve 13 from the gate chamber (e.g., the gate chamber 11) to the inlet passage section (e.g., inlet passage section 8), and a second venting passage 191*b* that extends through the gate valve 13 from the gate chamber to the outlet passage section (e.g., the outlet passage section 9). In this embodiment, each internal venting passage 191*a*, 191*b* starts at the top 163 of the gate 13 and terminates at the inlet and outlet sides 15, 17, respectively, of the gate 13 as shown in FIG. 9. A valve may be included in one or both internal venting passage 191*a*, 191*b*.

Figure 11:
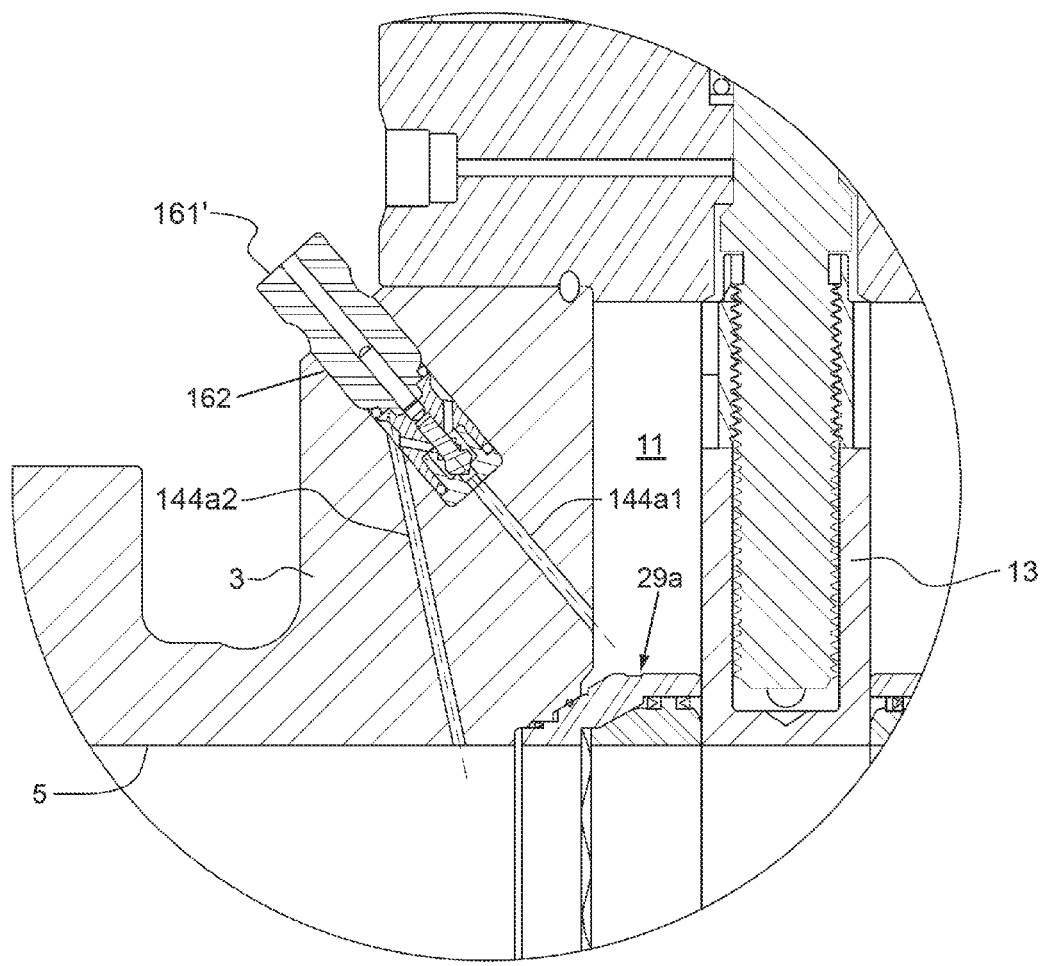
FIG. 11 is an enlarged partial cross-sectional view of an embodiment of a gate valve including poppet valves in the internal venting passages in accordance with the principles described herein.
Figure 12:
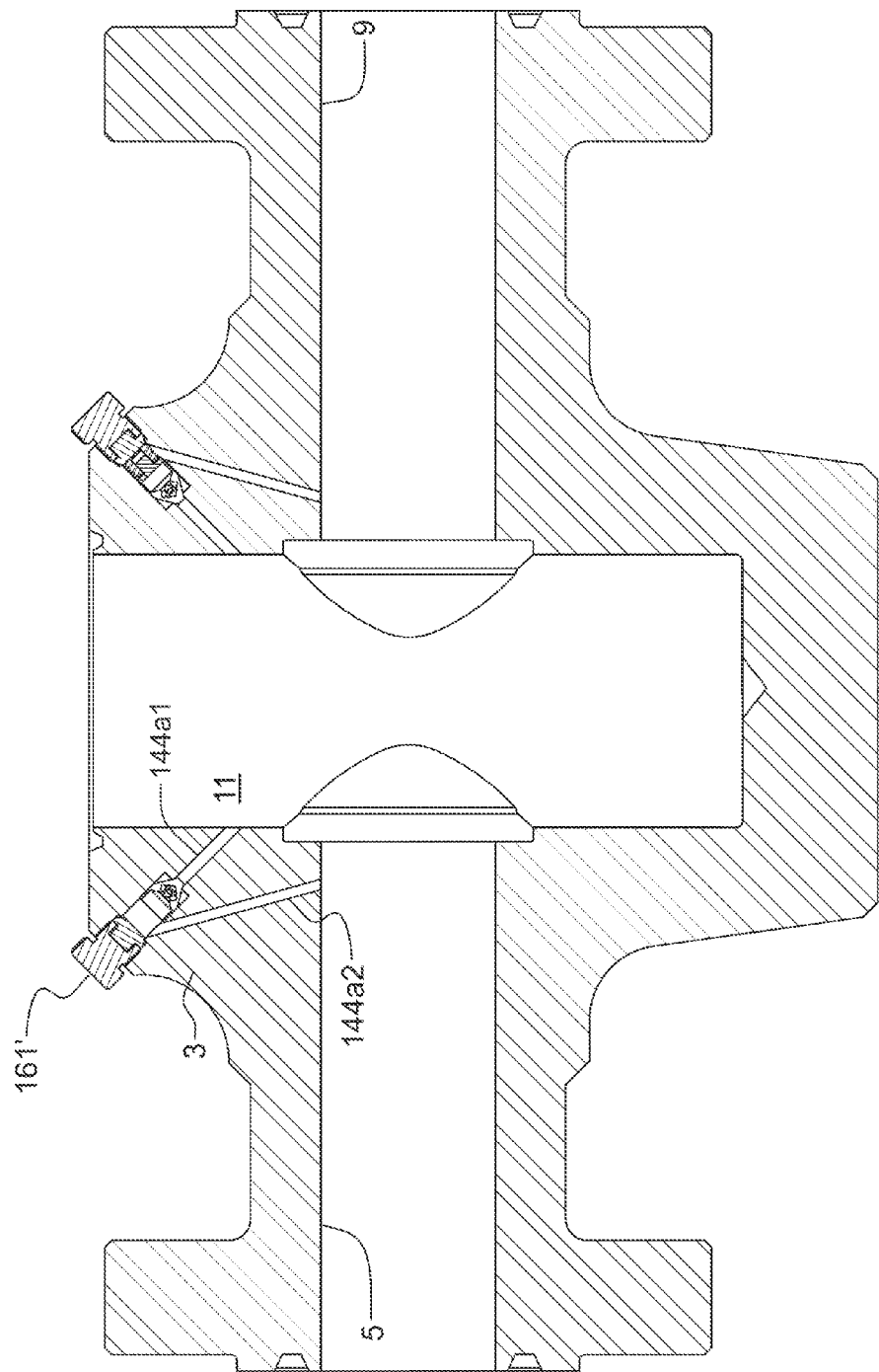
FIG. 12 is a cross-sectional view of an embodiment of a valve body for a gate valve in accordance with the principles described herein.
Figure 13:
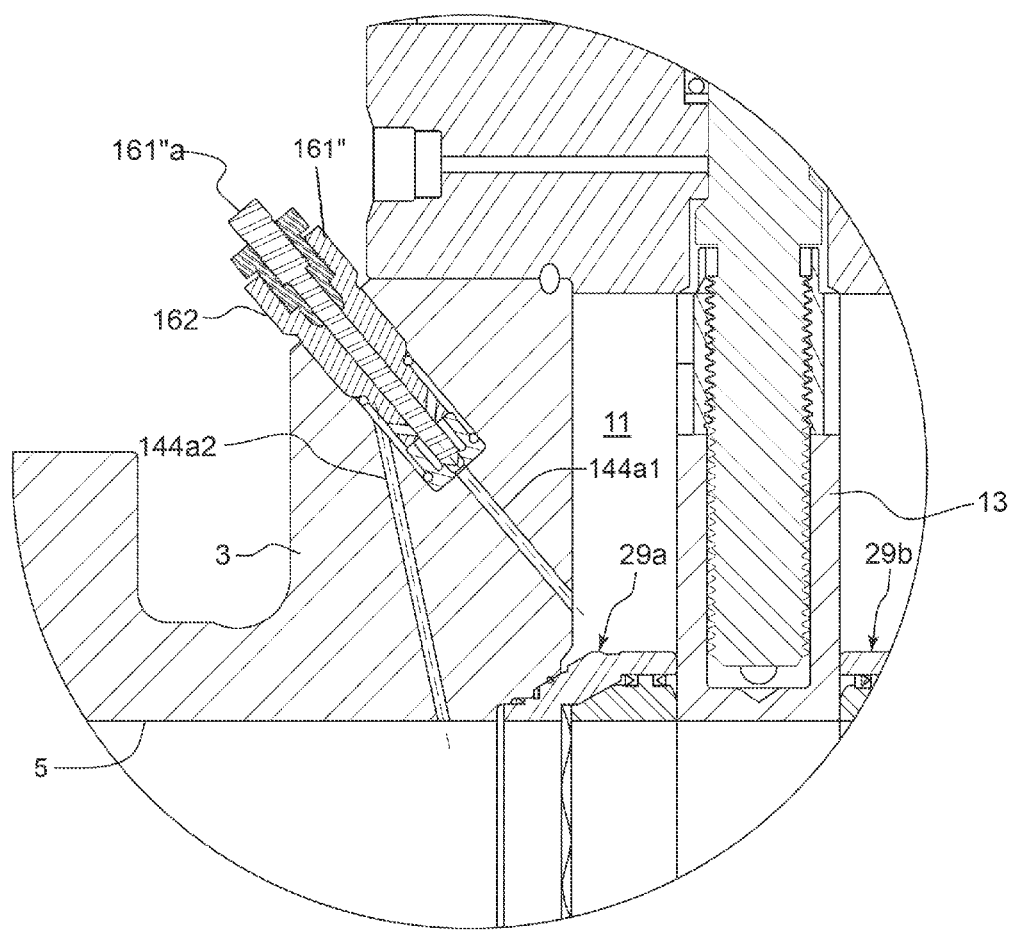
FIG. 13 is a partial cross-section of an embodiment of a gate valve including manually-controlled valves in the internal venting passages in accordance with the principles described herein.

In general, the valve disposed in embodiments of the internal venting passages previously described may be any suitable valve including, without limitation, a relief valve, a check valve, a poppet valve, or a manual valve. For example, in the embodiment shown in FIG. 6, each valve 145*a*, 145*b* is a relief valve; in the embodiment shown in FIG. 7, the valve 161 is a check valve; in the embodiment shown in FIGS. 11 and 12, the valve 161' is a poppet valve; and in the embodiment shown in FIG. 13, the valve 161" is a manually-controlled valve. In the case of a manually-controlled valve such as valve 161" in FIG. 13, the valve (e.g., the valve 161") is accessible from the exterior of the valve body 3 and is capable of being controlled manually to vent fluid pressure from the internal gate chamber 11 to the internal working fluid passage 5. One advantage of a manually controlled valve is that it allows the operator to decide when to allow pressure to build up in the internal gate chamber 11, and when to release pressure from the internal gate chamber 11. The manually-controlled valve has another advantage of allowing the operator to determine if it is safe to vent the internal gate chamber 11 before venting the internal gate chamber 11. In addition, with the manually-controlled valve, the operator can balance the pressure across the internal sealing arrangement 29*a* on the inlet side so that sealing is achieved at the internal sealing arrangement 29*b* on the outlet side. This will reduce the torque required to open the gate valve. In the embodiment shown in FIG. 13, opening and closing of the manually-controlled valve 161" is achieved by rotating the valve member 161"*a*.

Embodiments of the gate valves shown in FIGS. 1-3 and 5-7 (e.g., the gate valves 1, 81, 141) include telescoping upstream internal sealing arrangements (e.g., sealing arrangement 29*a*, 83*a*, 147*a*) and telescoping downstream internal sealing arrangements (e.g., sealing arrangement 29*b*, 83*b*, 147*b*) that each restrict and/or prevent fluid communication between the working fluid passage 5 and the gate chamber 11 when the gate 13 is in the open and closed positions. In general, a gate valve that can achieve sealing on the inlet and outlet sides provides superior corrosion resistance but requires a high torque to open the gate. On the other hand, embodiments of the gate valves shown in FIGS. 4 and 10 include a unitary or single-piece upstream sealing arrangement (e.g., sealing arrangement 113*a*, 171*a*) that restricts and/or prevents fluid communication between the working fluid passage (e.g., working fluid passage 5) and the gate chamber (e.g., gate chamber 11) in the open positioned, but allows limited fluid communication between the working fluid passage (e.g., working fluid passage 5) and the gate chamber (e.g., gate chamber 11) in the closed position. However, the embodiments of the gate valves shown in FIGS. 4 and 10 include a unitary or single-piece downstream internal sealing arrangement (e.g., sealing arrangement 113b, 171b) that restricts and/or prevents fluid communication between the working fluid passage and the gate chamber in the closed position. In general, a gate valve that can achieve sealing on the outlet side in the closed position requires less torque to open the gate, but is more susceptible to corrosion because the gate chamber is exposed to the working fluid.

Figure 10:
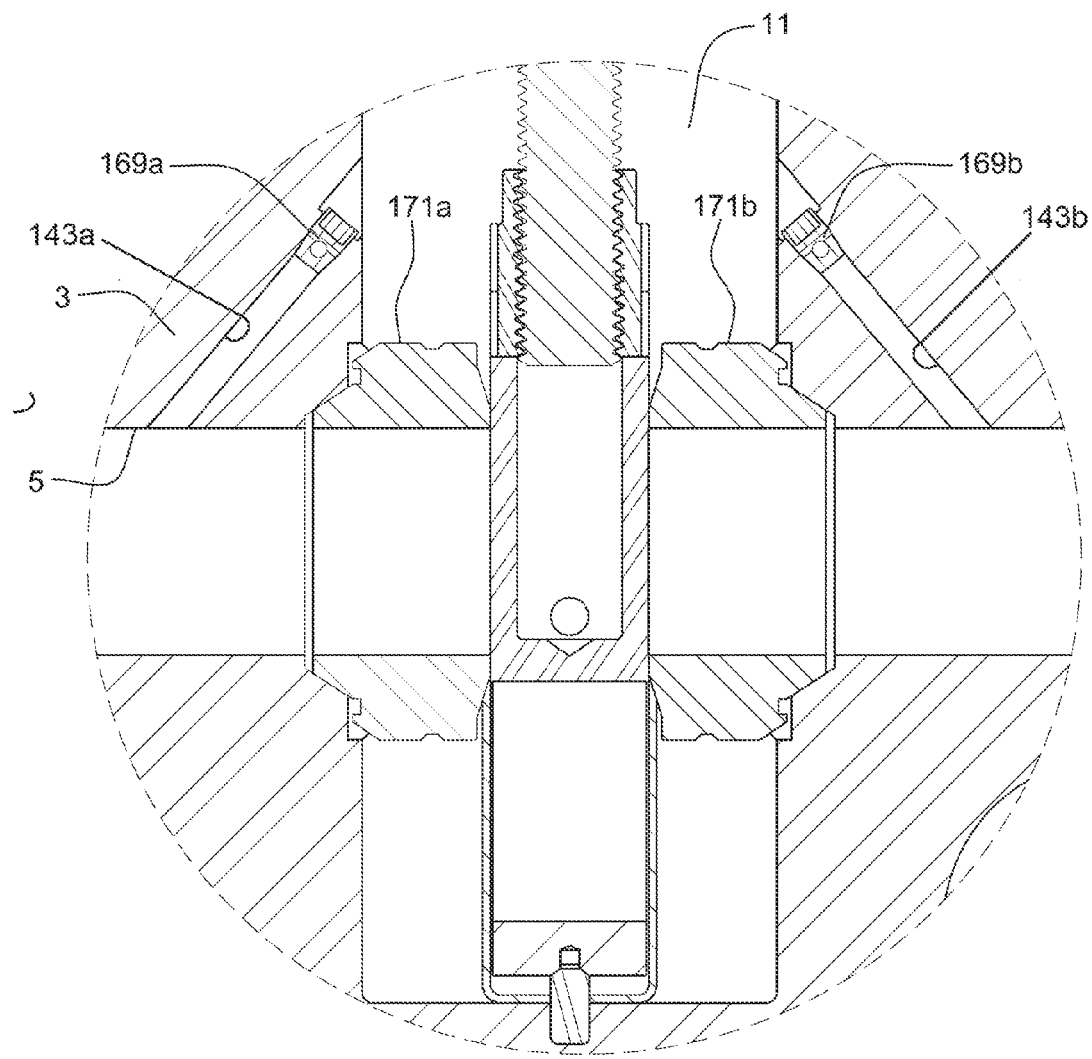
FIG. 10 is an enlarged partial cross-sectional view of an embodiment of a gate valve including seals in the internal venting passages in accordance with the principles described herein.

The gate valve shown in FIG. 10 allows a field conversion between a gate valve that seals on the inlet side and a gate valve that seals on the outlet side. In particular, plugs or rigid seal members 169a, 169b are disposed in the internal venting passages 143a, 143b, respectively, instead of valves, thereby preventing fluid in the internal gate chamber 11 from being vented into the internal working fluid passage 5. For a gate valve configured to achieve sealing on the outlet side, this allows the required pressure to build up within the internal gate chamber 11 so that the seals can be formed on the outlet side of the gate valve.

Sealing arrangements with single-piece sealing arrangements 171a, 171b, similar to the ones described in FIG. 4, are included in the gate valve shown in FIG. 10, and thus, the gate valve shown in FIG. 10 seals on the outlet side in the closed position. However, if a gate valve that seals from the inlet side is desired, the single-piece sealing arrangements 171a, 171b can be replaced with telescoping sealing arrangements (e.g., sealing arrangements 29a, 29b), and the rigid seal members 169a, 169b can be replaced with valves (e.g., valves 145a, 161, 161") that would allow venting of fluid pressure from the internal gate chamber 11 to the internal working fluid passage 5. As described above with reference to FIG. 13, conversion between sealing on the inlet side and sealing on the outlet side can also be achieved through manual control of the pressure distribution in the gate valve.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims.

What is claimed is:

1. A gate valve, comprising:
   a valve body having an internal working fluid passage with a longitudinal axis and an internal gate chamber extending transverse to the working fluid passage;
   a gate disposed in the internal gate chamber and movable within the gate chamber between a closed position obstructing fluid flow through the working fluid passage and an open position allowing fluid flow through the working fluid passage;
   an internal sealing arrangement coaxially disposed in the working fluid passage and extending between the valve body and the gate to form a barrier between the internal working fluid passage and internal gate chamber; and
   an internal venting passage extending from the internal gate chamber to the internal working fluid passage for selective venting of fluid pressure from the internal gate chamber to the internal working fluid passage;
   a valve disposed in the internal venting passage, wherein the valve is configured to automatically vent fluid pressure from the internal gate chamber to the internal working fluid passage at a predetermined pressure differential between the internal gate chamber and the internal working fluid passage;
   wherein the internal sealing arrangement includes a frustoconical metal sealing surface adapted to sealingly engage an opposed mating frustoconical metal sealing surface on the valve body to form a first metal-to-metal seal between the sealing arrangement and the valve body;
   wherein the internal sealing arrangement further comprises a metal sealing surface adapted to sealingly engage an opposed mating metal sealing surface on the gate to form a second metal-to-metal seal between the sealing arrangement and the gate;
   wherein the internal sealing arrangement comprises a radially outer seat carrier and a radially inner valve seat in telescoping arrangement between the valve body and the gate.

2. The gate valve of claim 1, wherein the frustoconical metal sealing surface of the internal sealing arrangement is concentrically disposed about a central axis oriented parallel to the longitudinal axis of the internal working fluid passage.

3. The gate valve of claim 1, wherein the first tapered metal-to-metal seal is formed between the outer seat carrier and the valve body, and the second metal-to-metal seal is formed between the inner valve seat and the gate.

4. The gate valve of claim 3, wherein the internal sealing arrangement further comprises an annular seal member disposed between the outer seat carrier and the valve body, wherein the annular seal member is adapted to form an annular seal between the outer valve seat member and the valve body.

5. The gate valve of claim 3, wherein the internal sealing arrangement further comprises a first seal member radially disposed between the outer seat carrier and the inner valve seat, and a second seal member radially disposed between the outer seat carrier and the inner valve seat, wherein the first seal member and the second seal member are each adapted to form a seal between the outer seat carrier and the inner valve seat.

6. The gate valve of claim 5, wherein the first seal member is a unidirectional seal adapted to restrict fluid flow in a first direction, and the second seal member is a unidirectional seal adapted to restrict fluid flow in a second direction that is opposite the first direction.

7. The gate valve of claim 3, wherein the outer seat carrier further includes a frustoconical metal sealing surface adapted to sealingly engage an opposed mating frustoconical metal sealing surface on the valve seat to form a third tapered metal-to-metal seal between the seat carrier and the valve seat.

8. The gate valve of claim 3, wherein the internal sealing arrangement further comprises a spring axially disposed between the outer seat carrier and the inner valve seat, wherein the spring is biased to urge the outer seat carrier and the inner valve seat axially apart to form the first metal-to-metal seal or the second metal-to-metal seal.

9. The gate valve of claim 1, further comprising a spring axially disposed between the valve body and the internal sealing arrangement, wherein the spring is biased to urge the internal sealing arrangement against the gate to form the second metal-to-metal seal.

10. The gate valve of claim 1, further comprising an annular seal member disposed between the internal sealing arrangement and the valve body, wherein the annular seal member is adapted to form a seal between the internal sealing arrangement and the valve body.

11. The gate valve of claim 1, wherein the first tapered metal-to-metal seal between the sealing arrangement and the valve body is a self-locking tapered seal.

12. The gate valve of claim 1, wherein the outer seat carrier further includes a frustoconical metal sealing surface adapted to sealingly engage an opposed mating frustoconical metal sealing surface on the valve seat to form a third metal-to-metal seal between the seat carrier and the valve seat.

13. The gate valve of claim 12, wherein the internal sealing arrangement further comprises a seal member disposed in a recess between the outer valve seat member and the inner valve seat member for forming a seal separate from the third metal-to-metal seal between the outer valve seat member and the inner valve seat member.

14. The gate valve of claim 1, further comprising a rigid seal member disposed in the internal venting passage.

15. A gate valve, comprising:
a valve body having an internal working fluid passage with a longitudinal axis and an internal gate chamber extending transverse to the working fluid passage;
a gate disposed in the internal gate chamber and movable within the gate chamber between a closed position obstructing fluid flow through the working fluid passage and an open position allowing fluid flow through the working fluid passage;
an internal sealing arrangement coaxially disposed in the working fluid passage and extending between the valve body and the gate to form a barrier between the internal working fluid passage and internal gate chamber; and
an internal venting passage extending from the internal gate chamber to the internal working fluid passage for selective venting of fluid pressure from the internal gate chamber to the internal working fluid passage;
a valve disposed in the internal venting passage, wherein the valve is configured to automatically vent fluid pressure from the internal gate chamber to the internal working fluid passage at a predetermined pressure differential between the internal gate chamber and the internal working fluid passage;
wherein the internal venting passage extends through the gate from the internal gate chamber to the internal working fluid passage.

16. The gate valve of claim 15, wherein the internal sealing arrangement comprises a radially outer seat carrier and a radially inner valve seat in telescoping arrangement between the valve body and the gate.

17. The gate valve of claim 15,
wherein the internal sealing arrangement comprises a radially outer seat carrier and a radially inner valve seat in telescoping arrangement between the valve body and the gate;
wherein the outer seat carrier includes a frustoconical metal sealing surface configured to sealingly engage an opposed mating frustoconical metal sealing surface on the valve seat to form a tapered metal-to-metal seal between the seat carrier and the valve seat.

18. The gate valve of claim 17, further comprising an annular seal member disposed between the internal sealing arrangement and the valve body, wherein the annular seal member is adapted to form a seal between the internal sealing arrangement and the valve body.

19. The gate valve of claim 17, wherein the radially outer seat carrier includes a frustoconical metal sealing surface adapted to sealingly engage an opposed mating frustoconical metal sealing surface on the valve body to form a first tapered metal-to-metal seal between the sealing arrangement and the valve body.

20. The gate valve of claim 17, wherein the inner valve seat comprises a metal sealing surface adapted to sealingly engage an opposed mating metal sealing surface on the gate to form a metal-to-metal seal between the sealing arrangement and the gate.

21. The gate valve of claim 20, wherein the internal sealing arrangement further comprises an annular seal member disposed between the outer seat carrier and the valve body, wherein the annular seal member is adapted to form an annular seal between the outer valve seat member and the valve body.

22. The gate valve of claim 20, wherein the internal sealing arrangement further comprises a first seal member radially disposed between the outer seat carrier and the inner valve seat, and a second seal member radially disposed between the outer seat carrier and the inner valve seat, wherein the first seal member and the second seal member are each adapted to form a seal between the outer seat carrier and the inner valve seat.

23. The gate valve of claim 22, wherein the first seal member is a unidirectional seal adapted to restrict fluid flow in a first direction, and the second seal member is a unidirectional seal adapted to restrict fluid flow in a second direction that is opposite the first direction.

24. The gate valve of claim 20, wherein the internal sealing arrangement further comprises a spring axially disposed between the outer seat carrier and the inner valve seat, wherein the spring is biased to urge the outer seat carrier and the inner valve seat axially apart to form the first metal-to-metal seal or the second metal-to-metal seal.

* * * * *